United States Patent [19]

Lentz

[11] 4,087,268
[45] May 2, 1978

[54] METHOD OF DELIVERING MOLTEN GLASS

[75] Inventor: William P. Lentz, Addison, N.Y.

[73] Assignee: Corning Glass Works, Corning, N.Y.

[21] Appl. No.: 788,615

[22] Filed: Apr. 18, 1977

[51] Int. Cl.² .................................................. C03B 5/26
[52] U.S. Cl. ........................................ 65/129; 65/126
[58] Field of Search ................ 65/126, 127, 128, 129, 65/130, 131, 132

[56] References Cited

U.S. PATENT DOCUMENTS 3,351,449  11/1967  Ambrogi ........................... 65/129 X
3,620,705  11/1971  Dockerty ........................... 65/129

Primary Examiner—Arthur D. Kellogg
Attorney, Agent, or Firm—Burton R. Turner; Clarence R. Patty, Jr.

[57] ABSTRACT

A gobbing member is operated wholly within the confines of a straight well portion of a glass delivery system, and completely submerged within the molten glass being delivered, such that the flow rate through the delivery orifice of such straight well is linearly related to the speed of said gobbing member independently of the position of such member within the confines of the straight well.

5 Claims, 3 Drawing Figures

METHOD OF DELIVERING MOLTEN GLASS

BACKGROUND OF THE INVENTION

In the past it has been customary to deliver charges of molten glass by utilizing a conventional tapered well with a cylindrical gobbing needle. Normally, such conventional tapered wells are relatively shallow, with the depth being comparable to the diameter, so that the range of stroke lengths of the gobbing needle are rather limited. Further, since the well is of a tapered configuration, the cross section is not uniform, and accordingly a non-uniform needle speed is required in order to produce a uniform flow rate at the orifice.

The conventional tapered well delivery system has not been completely satisfactory for all purposes due to the lack of adequate control obtainable between the tapered walls of the well and the gobbing needle. The control coupling obtainable between the needle and the walls of the tapered well is limited to a line coupling between the needle and the closest portion of the tapered well, while the needle is in its lowermost position. When the needle is raised upwardly, the control coupling is virtually nonexistent since the upwardly diverging tapered walls of the well produce a relatively large glass-flow opening between the needle and the well, which precludes an effective flow-control coupling therebetween. Accordingly, although some degree of control is obtainable with the tapered well configuration, the control is dependent upon needle position within the well and the utilization of relatively high viscosity glasses.

A further disadvantage encountered with the conventional tapered well resides in the fact that it is very difficult to prescribe the required needle velocities in order to obtain zero flow at the orifice when changing gob volume. That is, when the mean position of the needle in the well is raised or lowered to increase or decrease the gob volume respectively, it is necessary to change the rate of needle stroke in order to provide zero flow and prevent suckup at the orifice intermediate the gobbing cycle. The tapered well gobbing system has a further disadvantage in that it is practically impossible to separate gob weight control from suckup control, since by the very nature of the tapered well construction, one influences the other, and as a result a completely new cam configuration, prescribed by trial and error, is required every time a change in gob volume is made, in order to obtain zero flow at the orifice.

U.S. Pat. No. 3,620,705 to Dockerty sets forth a method and apparatus for feeding molten glass which overcame the problems heretofore enumerated with respect to the conventional tapered well feeders, by utilizing a straight well feeder with an elongated cylindrical needle. However, the elongated needle did not operate wholly within the confines of the well and relied upon a variable coupling between the needle and sidewalls of the well dependent upon its position therewithin, and accordingly the flow of molten glass through the discharge orifice was not only a function of the needle speed, but also a function of its position within the well. Therefore, the relationship defining the glass flow through the orifice became rather complex, resulting in the necessity of utilizing very complicated computer programs to define the required cam contour for operating such needle.

SUMMARY OF THE INVENTION

The present invention relates to a desired programmed delivery of molten glass from a delivery orifice wherein the flow rate through the orifice is linearly related to the speed of the gobbing member within the well of the glass delivery system. In its simplest form, therefore, the present invention includes an elongated straight well located below a feeder bowl, having substantially cylindrical sidewall portions and operatively containing a complemental gobbing member for reciprocal movement therewithin. Since the gobbing member operates wholly within the confines of the well, and since the well is vertically straight-sided, the flow rate through the orifice is linearly related to the speed of the gobbing member within the straight well feeder, and is independent of the position of the gobbing member within the confines of the straight-sided well.

Further the volume of glass delivered through the orifice is directly proportional to the length of the stroke (i.e. the distance traveled by the gobbing member within the straight well during a particular time element) and the time element of such stroke, and inversely proportional to the kinematic viscosity of the glass delivered. Such relationship includes easily ascertainable constants which depend only upon the dimensions of the well, the gobbing member and the orifice, and the head or height of glass within the glass delivery system.

Therefore, by properly choosing these dimensions, it is possible to encompass any desired range of delivery volumes, delivery times and viscosities with one delivery system, merely by adjusting the standard hydraulic feeder variables including the length and duration of the gobbing stroke. Furthermore, because of the linear relation between the speed of the gobbing member and the flow rate through the discharge orifice of the well, it is easy to calculate, through conventional coordinate plotting, the cam shape required to operate the valve on a standard hydraulic feeder so as to produce any programmed flow-rate that may be desired.

It thus has been an object of the present invention to provide an improved process for delivering molten glass from a discharge orifice at a desired programmed rate of flow, such that the rate of flow through the orifice is linearly related to the speed of the gobbing member and independent of its position within the confines of the feeder well.

DESCRIPTION OF THE PREFERRED EMBODIMENTS

Figure 1:
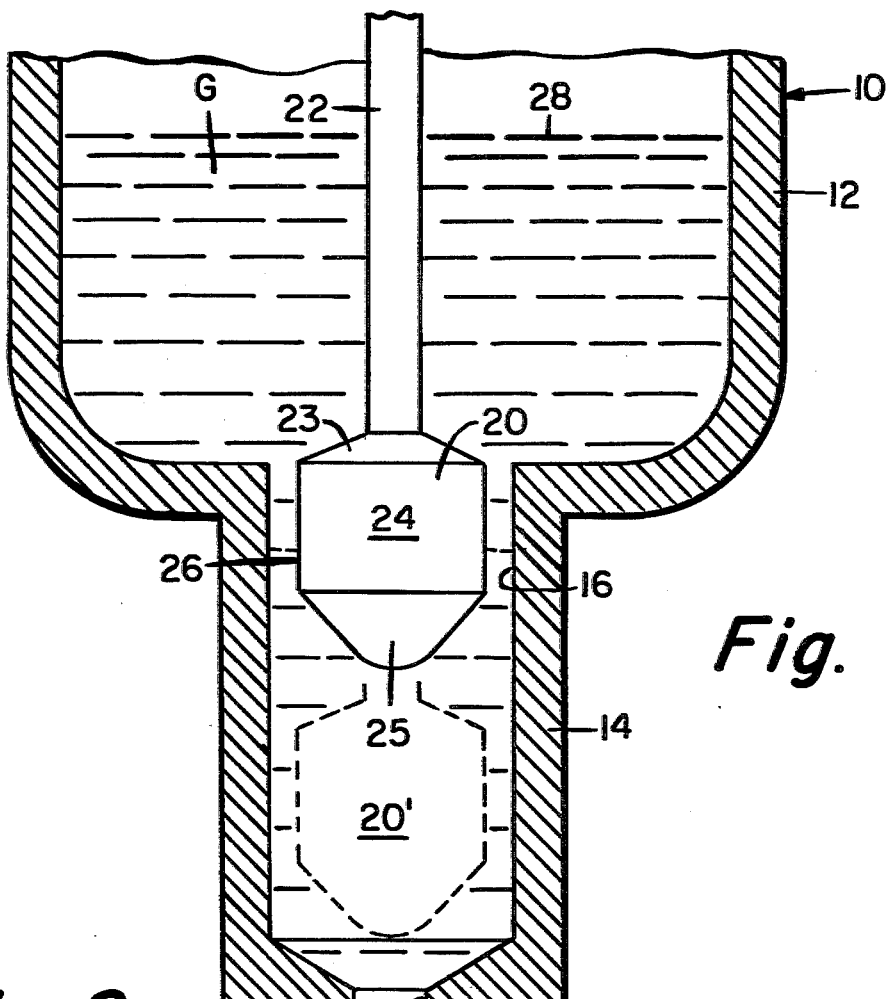
FIG. 1 is an elevational view, partially in section, illustrating a lower portion of glass feeder or delivery system having an elongated straight well, and provided with a gobbing member operably positioned therein.

Referring now to FIG. 1, the lower portion of a glass feeder or delivery system 10 is shown including a bowl 12 containing molten glass G, and an elongated well portion 14 extending downwardly from the bowl 12.

The elongated or deep well 14 is preferably formed with a circular cross section having a cylindrical inner surface, providing vertically straight-sided wall portions 16 extending downwardly below the bowl 12, and terminating at its lower end in a circular discharge orifice 18.

A gobbing member or "hummox" 20, as it is sometimes referred to in the industry, is positioned within the elongated well 14 for reciprocal movement therewithin. The gobbing member is preferably formed in the shape of a body of revolution, with its axis of symmetry being coaxial with the longitudinal axis or centerline of the elongated well 14. An operating shaft 22, connected at its upper end to a standard hydraulic feeder mechanism, is connected to the upper end of the gobbing member 20 to operatively reciprocate said gobbing member wholly within the confines of said elongated well 14. The shaft 22 is substantially smaller than the diameter of the well so as to have negligible effect if any on the sidewalls of the well, and is caused to move up and down in a programmed manner through the use of a cam having a desired contour for operating the valve of the hydraulic feeder mechanism to which the shaft is operatively connected.

The gobbing member 20 is shown comprising essentially an operable cylindrical body portion 24 having sidewall portions 26 complemental with the straight side wall portions 16 of the well 14. Further, the shaft 22 may be connected to the cylindrical body portion 24 of the gobbing member 20 by means of a shoulder portion 23, and a tapered nose portion 25 may be provided to reduce cavitation. As noted in the drawing, however, the operative cylindrical body portion 24 of the gobbing member 20 is confined wholly within the elongated well portion 14 during the cyclic reciprocation of the gobbing member, shown in its uppermost position at 20 and its lowermost position at 20' within the well 14.

Due to the fact that the well 14 is provided with straight side walls 16, the flow rate Q through the orifice 18 is linearly related to the speed of the gobbing member 20 within the well 14 as follows:

$$Q/Q_o = U/U_o + 1$$

wherein Q is the flow rate through the orifice 18 corresponding to a downward speed U of the gobbing member 20, $Q_o$ is the flow rate through the orifice 18 when the speed of the gobbing member 20 is zero, and $U_o$ is the speed of the gobbing member 20 that gives zero flow through the orifice 18.

Figure 3:
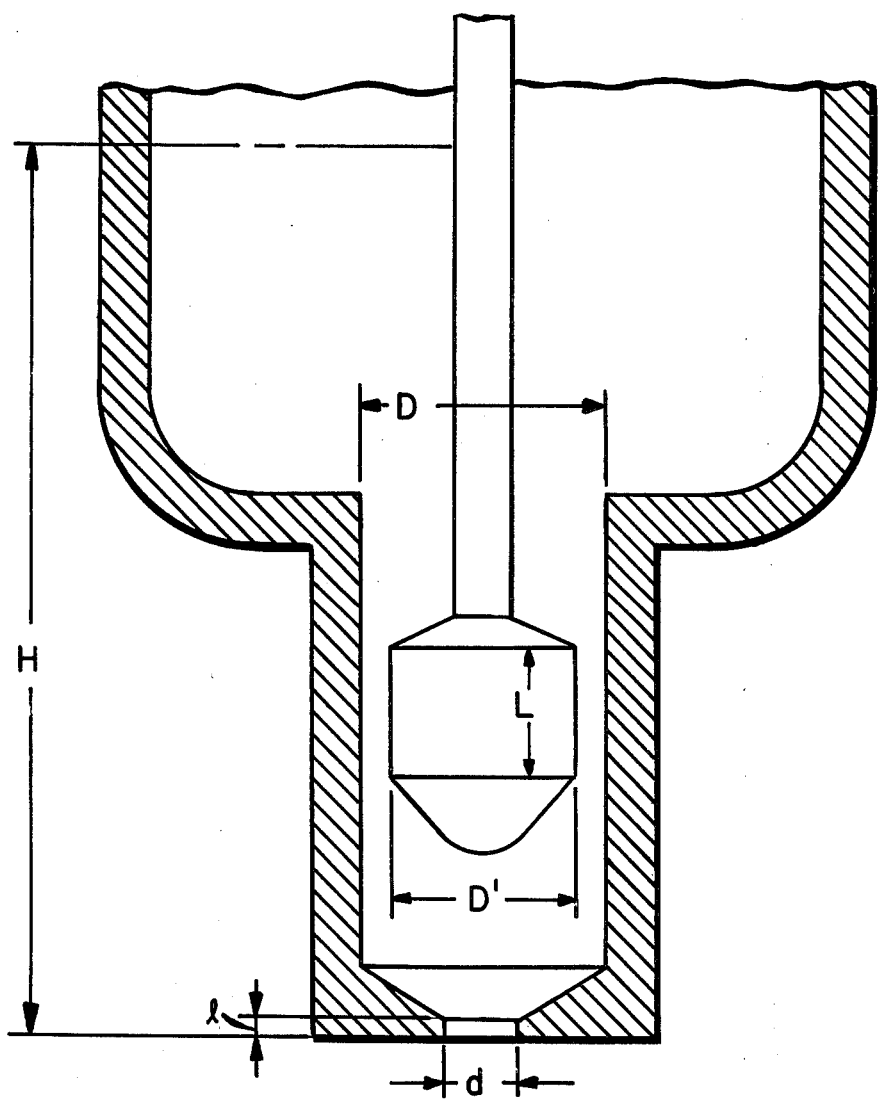
FIG. 3 is a schematic illustration of the delivery system shown in FIG. 1, indicating the various dimensions utilized to define the constants incorporated in the glass delivery relationships provided by the system.

For a given delivery time T, the relationship between the volume of glass delivered and the length of stroke required is as follows:

$$V/Q_o = S/U_o + T$$

wherein V is the volume of the glass delivered through the orifice 18 during the time T, and S is the length of the stroke (i.e. the distance traveled by the gobbing member 20 during the time T). Both $Q_o$ (the flow rate through the orifice when the gobbing member is zero) and $U_o$ (the speed of the gobbing member that provides zero flow at the orifice) are inversely proportional to the viscosity of the glass, and accordingly:

$$AV = BS + T/v$$

wherein $v$ is the kinematic viscosity of the glass (the viscosity in poises divided by the density of the glass) and A and B are constants that depend only upon the dimensions of the elongated wall portion 14, the cylindrical body portion 24 of the gobbing member 20 and the orifice 18, together with the height or head of the molten glass G above the orifice as determined by the glass line or surface 28 of the glass within the feeder 10. It is understood, of course, that $Q_o$ and $U_o$ may be determined empirically merely by measuring such quantities, or they may be determined mathematically through the relationship of $Q_o = 1/Av$ and $U_o = 1/Bv$. Further, A and B may easily be determined from the physical dimensions of the well, gobbing member, orifice and glass height through the following relationships:

$$A = \frac{128}{\pi D^4 gH}\left[\left(L + \frac{2}{5}D\frac{\alpha-1}{\alpha}\right)\frac{\ln\alpha}{\alpha^2-1}\gamma + \left(\frac{D}{d}\right)^4\left(l + \frac{3\pi d}{32}\right)\right]$$

$$B = \frac{16\left(L + \frac{2}{5}D\frac{\alpha-1}{\alpha}\right)}{D^2 gH} \cdot \frac{\gamma}{\alpha^2}$$

where $\alpha = \frac{D}{D'}$ and $\gamma = \frac{\alpha^4}{(1+\alpha^2)\ln\alpha - \alpha^2 + 1}$ and wherein, referring to FIG. 3, $\pi$ is the known constant
$D$ is the diameter of the well
$D'$ is the diameter of the gobbing member
$d$ is the diameter of the orifice
$L$ is the length of the gobbing member
$l$ is the length of the orifice
$H$ is the total glass head above the orifice, and
$g$ is the known gravitational acceleration.

Accordingly, it thus can be seen that by properly choosing the physical dimensions of the well and gobbing member, it is possible to encompass any desired range of delivery volumes, delivery times and viscosities with one delivery system, merely by adjusting the standard hydraulic feeder variables including the length of the stroke of the gobbing member, and the time of such stroke which, of course, are programmed by the cam operating the valve on the feeder. Furthermore, because of the linear relation between the speed of the gobbing member 20 and the flow rate through the orifice 18, simple coordinate plotting programs may be utilized to calculate the cam shape required to activate the hydraulic mechanism for producing any programmed flow rates that may be desired.

The cross section of the well portion 14 need not be circular, however the circular shape does in fact lend itself to ease of analysis and fabrication. Further, the gobbing member 20 need not be cylindrical as shown in the drawings, since it may be any shape provided the impedance to flow between the surface of the gobbing member and the walls of the well portion have the proper value for the operating range desired. Again, however, the cylindrical shape of the gobbing member lends itself both to ease of analysis and fabrication.

Figure 2:
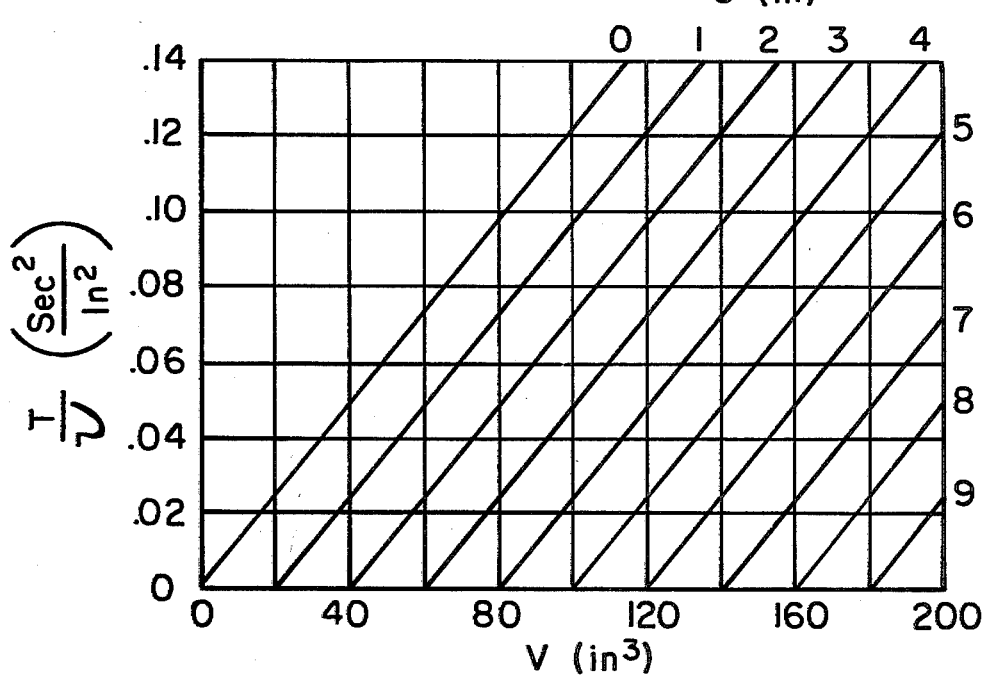
FIG. 2 is an illustrative graph showing the relationship between the discharge volume and the length of stroke of the gobbing member, with respect to the delivery time divided by the kinematic viscosity of the glass.

Referring now to FIG. 2, the linear relationship between the delivered volume, length of stroke and duration of stroke is shown, as represented by the previously presented equation $AV = BS + T/v$. Thus, for a specific $A = 1/820$ and $B = 1/41$, should one desire a specific gob volume in cubic inches to be delivered in a specific time element which is specified in terms of the kinematic viscosity of the glass utilized, he would go to the graph of FIG. 2 and find the length of stroke to be utilized. For instance, should a gob volume of 180 cubic inches be desired in a time element of 0.12 seconds$^2$ per inch$^2$, in the particular illustration set forth, one would provide the gobbing member 20 with a stroke of 4 inches. Again, it should be noted, that except when the gobbing member is adjacent the bottom of the well, the relative position of the gobbing member 20 within the well portion 14 is immaterial since it does not become a factor in the linear equation specifying the stroke to be used. What is important, however, is the fact that the operation of the gobbing member 20 is limited solely to the confines of the elongated well portion 14.

It is understood, of course, that the graph and various illustrations are given merely as representative examples, and are no way limiting in nature since they are specific to particular parameters which may be utilized. Accordingly, various changes and modifications may be made to the invention as disclosed without departing from the spirit and scope thereof as defined in the appended claims.

I claim:

1. A method of delivering molten glass with a controlled flow rate and desired gob volume which comprises, providing an elongated feeder well with extended vertical inner sidewall portions communicating with a discharge orifice of reduced diameter relative to said well, positioning a gobbing member having complimentary vertical sidewall portions within said well, filling said well with molten glass, maintaining a molten glass line above the upper extent of said well, vertically reciprocating said gobbing member solely within the confines of said elongated well and wholly below said glass line by means of an operating shaft of smaller diameter than said gobbing member which does not function as a gobbing member, and thereby delivering molten glass through said orifice whereby the delivered volume is linearly related to the length of the stroke of said reciprocating gobbing member within the confines of said well and the rate of molten glass flowing through said orifice is linearly related to the speed of movement of said gobbing member wholly within the confines of said elongated well.

2. A method of delivering molten glass as defined in claim 1 wherein said gobbing member is reciprocated solely within the confines of said elongated well to discharge molten glass through said orifice, and the volume of molten glass discharged through such well is controlled through the following relation:

$$AV = BS + T/v$$

wherein $v$ is the kinematic viscosity of the glass, A and B are constants that depend only on the dimensions of the well, gobbing member, orifice and height of glass, and S is the length of the stroke of the gobbing member within the confines of the well as represented by the distance traveled by the gobbing member during a desired time interval T.

3. A method of delivering molten glass as defined in claim 1 wherein the flow rate of molten glass delivered through said orifice is, except when the gobbing member is adjacent the bottom of the well, independent of the position of said gobbing member reciprocating in said elongated well.

4. A method of delivering molten glass as defined in claim 1 including the step of controlling the flow rate of molten glass through said orifice by regulating the speed of movement of said gobbing member within the confines of said elongated well such that the flow rate through the orifice corresponding to a given downward gobbing speed divided by the flow rate through the orifice when the gobbing member is at rest, is equal to said given downward gobbing speed divided by the speed of the gobbing member that provides zero flow through the orifice, plus one.

5. A method of delivering molten glass as defined in claim 1 including the step of controlling the volume of molten glass discharged through said orifice by reciprocating said gobbing member solely within the confines of said elongated well and regulating the length of stroke that the gobbing member travels during a desired time interval, such that the volume delivered through the orifice is equal to the product of, the sum of the quotient of the stroke length divided by the speed of the gobbing member that gives zero flow through the orifice and the desired interval, times the flow rate through the orifice when the gobbing member is at rest.

* * * * *